United States Patent [19]

Benson et al.

[11] Patent Number: 5,247,794
[45] Date of Patent: Sep. 28, 1993

[54] CYLINDER BLOCK POSITIVE HOLD-DOWN FOR COLD START-UP

[75] Inventors: Victor N. Benson; Wayne A. Flygare; William J. Puskac, all of Rockford, Ill.

[73] Assignee: Sundstrand Corporation, Rockford, Ill.

[21] Appl. No.: 580,537

[22] Filed: Sep. 11, 1990

[51] Int. Cl.$^5$ .............................................. F16D 39/00
[52] U.S. Cl. ..................................... 60/487; 91/499; 92/12.2; 92/57; 92/71
[58] Field of Search ................... 60/487; 91/485, 499, 91/507, 489; 92/12.2, 57, 70, 71

[56] References Cited

U.S. PATENT DOCUMENTS

| | | | |
|---|---|---|---|
| 2,691,350 | 10/1954 | Greer | 91/487 |
| 3,479,963 | 11/1969 | Randa et al. | 91/485 |
| 4,794,756 | 1/1989 | Iseman | 60/439 |
| 4,815,358 | 3/1989 | Smith | 92/71 |
| 4,898,077 | 2/1990 | McBeth | 92/12.2 |
| 4,948,343 | 8/1990 | Shimizu | 92/12.2 |

FOREIGN PATENT DOCUMENTS

| | | | |
|---|---|---|---|
| 0175206 | 3/1986 | European Pat. Off. | 91/499 |
| 2130514 | 12/1972 | Fed. Rep. of Germany | 91/499 |
| 120474 | 12/1965 | Netherlands | 91/499 |
| 236828 | 7/1945 | Switzerland | 91/507 |

Primary Examiner—Edward K. Look
Assistant Examiner—Hoang Nguyen
Attorney, Agent, or Firm—Antonelli, Terry, Stout & Kraus

[57] ABSTRACT

An integrated drive generator for an aircraft and a method of making and operating the same result in improved operation of the integrated drive generator, especially during cold start-up. This is accomplished through the use of at least one stop to prevent each of the cylinder blocks in the hydraulic pump and motor assembly of the integrated drive generator from moving away from the port plate more than a predetermined amount which will ensure establishment of hydraulic continuity between the pump and motor without substantial delay during cold start-up of the integrated drive generator.

24 Claims, 7 Drawing Sheets

FIG. 10

CYLINDER BLOCK POSITIVE HOLD-DOWN FOR COLD START-UP

TECHNICAL FIELD

The present invention is directed to an improved integrated drive generator, and particularly hydraulic pump and motor assemblies therefor, and to a method of making and operating the same for improving the operation of the integrated drive generator (IDG) during cold start-up.

BACKGROUND ART

The start-up of an integrated drive generator involves the establishment of hydraulic unit continuity between the fixed and variable displacement hydraulic units of the hydraulic pump and motor assemblies of the integrated drive generator. To comply with many specification requirements this continuity must be accomplished early in the start-up cycle. During start-up at normal temperatures, this routinely occurs as soon as oil is supplied to the hydraulic units of the IDG. However, at extremely low temperatures a problem can occur which results in the delay or prevention of the aforementioned continuity, causing the integrated drive generator to violate the specification limits. In particular, the problem occurs that an electrical load on an airplane cannot be carried by the electrical generator immediately after start-up even though the aircraft engine reaches idle. The failure to establish hydraulic unit continuity also results in inadequate hydraulic pressure for lubrication of journal bearings which can lead to bearing failure.

Figure 1:
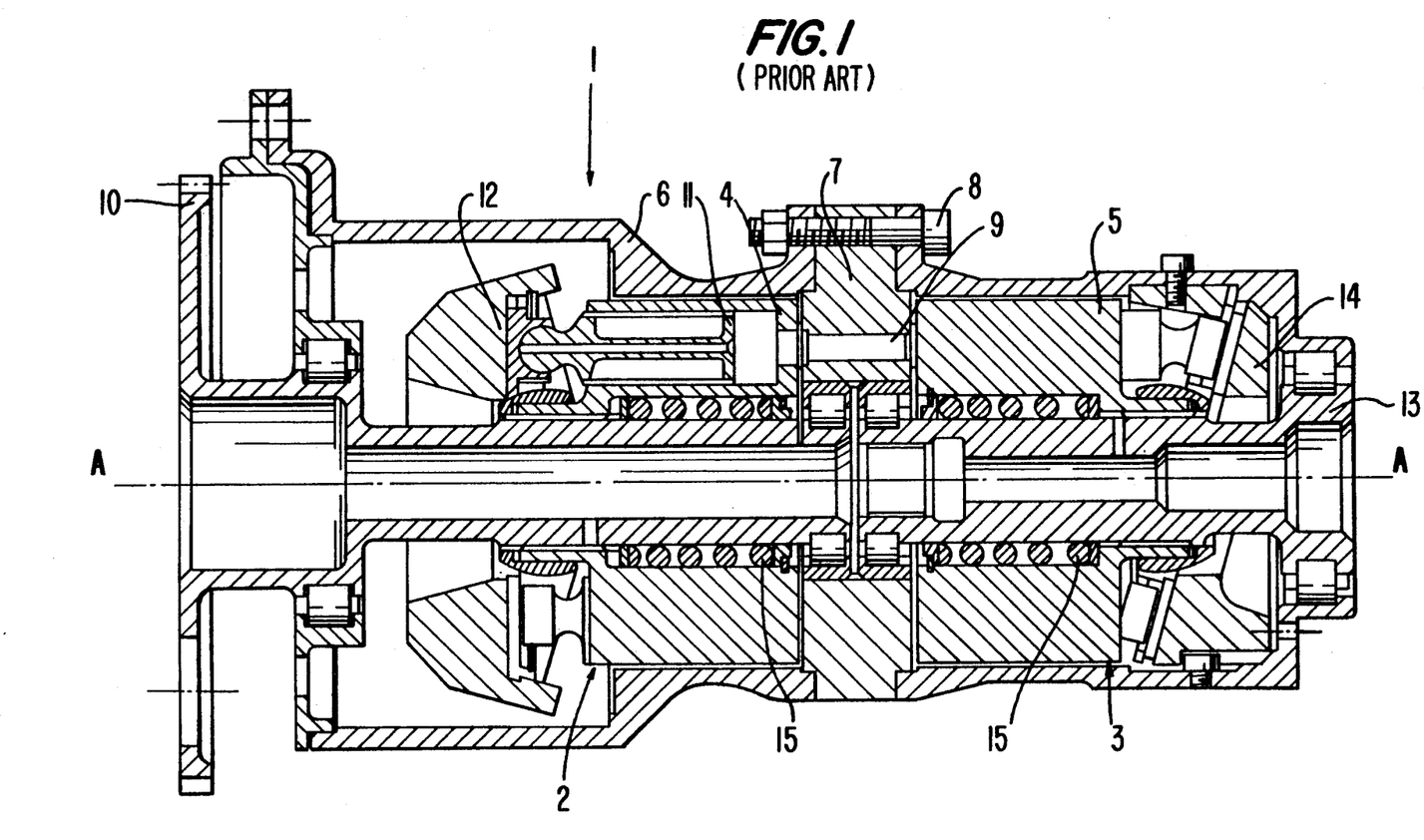
FIG. 1 is a cross-sectional view taken along the axis of rotation of a prior art hydraulic pump and motor assembly of an integrated drive generator.

An example of a prior art hydraulic pump and motor assembly for an integrated drive generator of an aircraft is illustrated in FIG. 1 of the drawings. As indicated therein, the hydraulic pump and motor assembly 1 comprises a variable displacement hydraulic pump 2 and a fixed displacement hydraulic motor 3. The pump 2 and motor 3 have respective cylinder blocks 4 and 5 which are arranged for rotation about a common axis A—A within a housing 6 on opposite sides of a stationary port plate 7 of the hydraulic pump and motor assembly. The port plate 7, at its outer flange is secured between respective portions of the housing 6 by bolts 8. The port plate 7 is formed with apertures 9 through which hydraulic fluid communication between the pump 2 and motor 3 is established during normal operation of the hydraulic pump and motor assembly. Helical coil springs 15 resiliently bias the cylinder blocks in the direction of the port plate 7.

The operation of the hydraulic pump and motor assembly in an integrated drive generator of an airplane involves transmission of torque from an engine of the airplane to an input 10 which rotates the input about the axis A—A. The cylinder block 4 of the pump is connected to a shaft of input 10 for rotation therewith. Pistons 11 within the cylinder block 4 of the pump 2 are displaced during this rotation an amount which is a function of the setting of a variable swash plate 12 of the pump. Hydraulic fluid under pressure from the pump 2 is delivered to the hydraulic motor 3 through the port plate 7 for rotating the cylinder block 5 and an output shaft 13 to which it is fixedly connected. The swash plate 14 of the motor 3 is fixed so that the operating speed of the motor 3 is a function of the displacement of the pump 2. The rotary output from output shaft 13 is added to or subtracted from the rotary motion from the engine through the conventional differential gearing of an integrated drive generator for operating an electrical generator at a substantially constant rotational speed. That is, since the speed of the rotation from the airplane engine to the input 10 of the hydraulic pump and motor assembly will vary, the position of the variable swash plate 12 is adjusted in response to these detected speed variations for providing the necessary reduction or increase in this speed for obtaining the desired constant output speed to the generator. During normal operation there is a hydrostatic balance of the cylinder blocks and port plate.

DISCLOSURE OF INVENTION

An object of the present invention is to provide an improved integrated drive generator and more particularly, a hydraulic pump and motor assembly for use with the generator and a method of making and operating the same, which avoid the aforementioned problems with conventional integrated drive generators and the hydraulic differentials therefor. More particularly, an object of the invention is to provide an improved integrated drive generator and a hydraulic pump and motor assembly therefor whereby hydraulic unit continuity between the fixed and variable displacement hydraulic units of the assembly can be accomplished early in the start-up cycle, even under extremely low temperature conditions, where viscosity of the fluid is quite high, so that an electrical load on the airplane can be carried when the engine reaches idle and so that system bearings will be promptly lubricated.

A further object of the invention is to provide an improved integrated drive generator and a hydraulic pump and motor assembly therefor and a method of making and operating the same which solve the aforementioned problems in known integrated drive generators at relatively low cost. These and other objects are attained by the present invention as discussed below.

Specifically, tests have been conducted by the inventors to determine the cause of the aforementioned problems during cold start-up of conventional integrated drive generators. It has been found as a result of these tests that during the first few revolutions of start-up of the cold generators, a significant viscous drag force exists between the pistons and the hydraulic cylinder blocks of the hydraulic units which causes the blocks to tip and/or move axially away from their porting plate. When oil is provided to the units at this time, pressurized, hydrodynamic films build up between the blocks and the port plate faces which inhibit the reseating of the blocks onto the porting plate surfaces. This delays the establishment of the desired hydraulic unit continuity, causing the integrated drive generator to violate specification limits at extremely low temperatures, where viscosity of the fluid is quite high. As noted above, the failure of the conventional integrated drive generator to develop sufficient charge pressure on cold start makes it impossible to bring the electrical generator up to speed in a proper time. Thus, it is not possible to carry any electrical load on the airplane when the engine reaches idle and the lack of charge pressure can also cause a problem in lubricating journal bearings which require lubrication to avoid failure.

The integrated drive generator of the invention solves the aforementioned problem by providing at least one stop for preventing of the cylinder blocks of the hydraulic units of the hydraulic pump and motor assembly from moving away from the port plate more than a predetermined amount which will ensure establishment of hydraulic continuity between the pump and motor without substantial delay during cold start-up of the integrated drive generator. Through the use of such a positive mechanical hold-down of the cylinder blocks, the tilting or lifting off of the cylinder blocks with respect to the port plate during cold start-up is not possible whereby the buildup of pressurized, hydrodynamic films between the blocks and the port plate faces and the unseating of the blocks with respect to the port plate faces does not take place during cold start-up. The at least one stop preferably limits movement of the cylinder blocks away from the port plate an amount which is less than 0.010 inch.

According to a first embodiment of the invention, the at least one stop is provided on the housing means of the hydraulic pump and motor assembly for interaction with the cylinder blocks. In other embodiments the stops are provided on a shaft of the hydraulic unit on which the cylinder block is mounted. In several embodiments a mechanism is provided for adjusting the predetermined amount or gap during assembly of the hydraulic pump and motor assembly or after assembly where the adjusting mechanism is accessible outside the housing means.

The stops for holding down the cylinder blocks can also be located in the vicinity of or even combined with the means for resiliently biasing the cylinder blocks in the direction of the port plate. In one form of the invention a square spring is employed which is compressed to a solid height between a shaft shoulder and a cylinder block for preventing further movement of the cylinder block away from the port plate.

According to another embodiment, a stop is located on a shaft on which the cylinder block is mounted. The stop interacts with a spring seat attached to the cylinder block for preventing the cylinder block from moving away from the port plate more than the predetermined distance. The spring seat also serves as a seat for a spring of the means for resiliently biasing.

The method of making an integrated drive generator of the invention, as seen from the above description of the integrated drive generator and hydraulic pump and motor assembly of the invention, comprises providing stops to prevent the cylinder blocks of a hydraulic pump and motor assembly from moving away from the port plate more than a predetermined amount which will ensure establishment of hydraulic continuity between the pump and motor without substantial delay during cold start-up of the integrated drive generator. Similarly, the method of operating the integrated drive generator comprises holding down or preventing the cylinder blocks from moving away from the port plate more than the predetermined amount which ensures establishment of hydraulic continuity between the pump and motor without substantial delay during cold start-up of the integrated drive generator.

These and objects, features and advantages of the present invention will become more apparent from the following description when taken in connection with the accompanying drawings, which show, for purposes of illustration only, several embodiments in accordance with present invention.

BEST MODE FOR CARRYING OUT THE INVENTION

Figure 2:
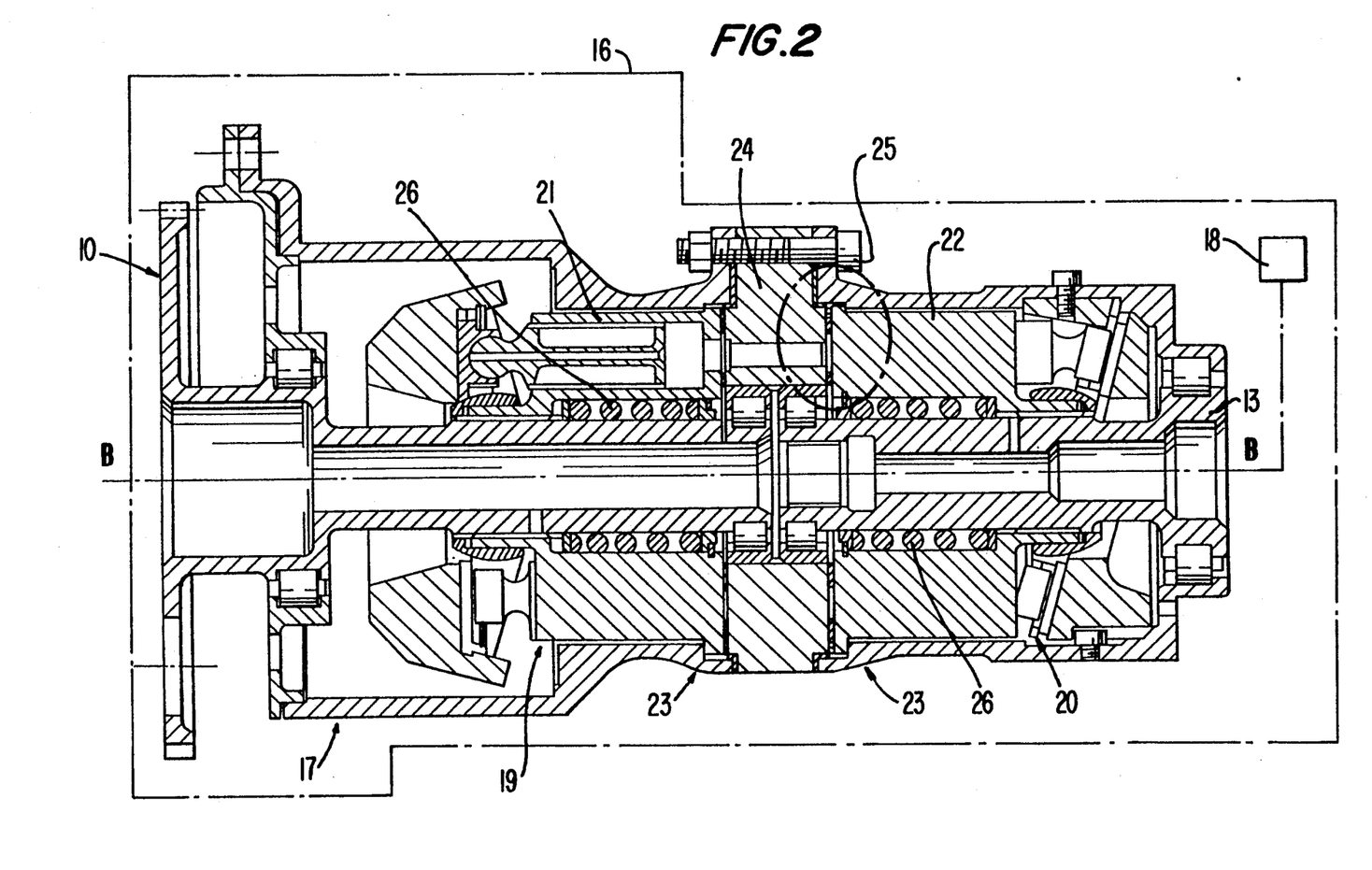
FIG. 2 is a schematic illustration of an integrated drive generator according to a first embodiment of the invention with the hydraulic amplifier thereof being shown in cross-section along the axis of rotation.

Referring now to the FIG. 2, the integrated drive generator 16 according to a first embodiment of the invention comprises a hydraulic pump and motor assembly 17 whose input 10 is rotatably driven by torque from an engine of the airplane and an output 13 which is used for adjusting the operating speed of the drive to an electric generator 18 for maintaining a substantially constant operating speed of the generator. The hydraulic pump and motor assembly 17 of the integrated drive generator 16 comprises a variable displacement pump 19 and a fixed displacement hydraulic motor 20 having respective cylinder blocks 21 and 22 mounted for rotation within a housing 23 of the pump and motor assembly for rotation about a common axis B'B on respective sides of a stationary port plate 24 which is bolted between respective sections of the housing 23 by means of bolts 25. Helical coil springs 26 resiliently bias the cylinder blocks toward the port plate 24. During normal operation of the hydraulic differential 17 and integrate drive generator 16, a hydrostatic balance of the blocks and port plate is established.

Figure 3:
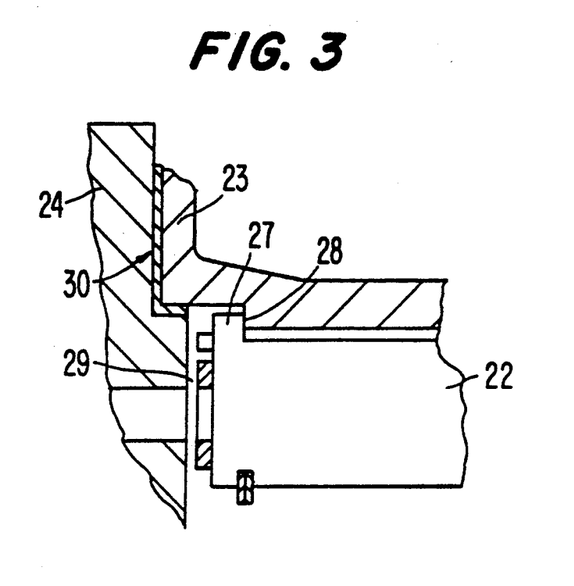
FIG. 3 is an enlarged view of the circled portion of the hydraulic pump and motor assembly of FIG. 2.

According to the invention, an annulus 27 of material, see FIG. 3, is provided on each of the cylinder blocks 21 and 22 which will abut against a shoulder 28 provided on the associated hydraulic unit housing. During cold start-up of the integrated drive generator, i.e. at extremely low temperatures where fluid viscosity is quite high, the viscous oil shear force from the intake pistons of the pump 2 and motor 3 of the pump and motor assembly 17 is not able to lift off the cylinder blocks 21 and 22 from the port plate 24 by an amount which would prevent establishment of hydraulic continuity between the pump and motor without substantial delay because of the positive mechanical hold-down of the cylinder block by the shoulders 28 on the housing sections. As shown in FIG. 3, a small gap 29 is permitted between the port plate 24 and the cylinder block 22 when the annulus 27 and shoulder 28 are engaged to restrict further movement of the cylinder block away from the port plate. The gap 29 must be small enough to prevent substantial leakage of cold oil through the gap. In the disclosed embodiment the gap is preferably less than 0.010 inch. It has also been determined from tests that the problem in delay of start-up under cold temperature conditions can also be avoided by totally eliminating the gap 29. According to a further feature of the invention, in order to maintain close control of the amount that the cylinder blocks are permitted to move away from the port plate, shims 30 can be located between the port plate 24 and the housing sections of housing 23 for closely setting this predetermined amount during assembly of the hydraulic pump and motor assembly.

Figure 4:
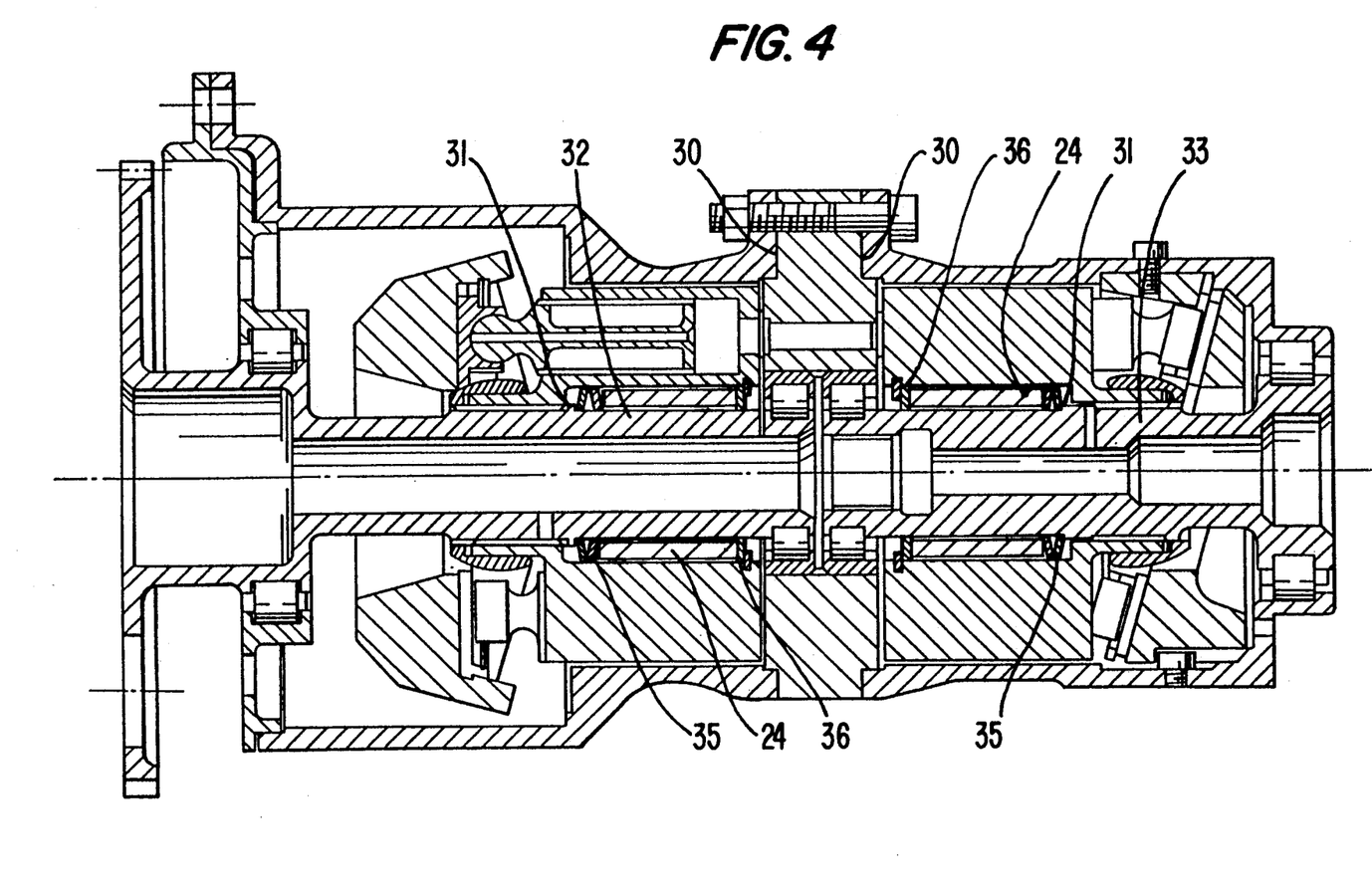
FIG. 4 is a cross-sectional view taken along the axis of rotation of a hydraulic pump and motor assembly according to a second embodiment of the invention.

In the embodiment of FIG. 4, instead of providing a stop in the form of a shoulder 28 on the housing 23, shoulders 31 are provided on the respective shafts 32 and 33 of the pump 19 and motor 20. The helical coil springs 26 in the embodiment of FIGS. 2 and 3 are replaced by spacer tubes 24 arranged serially with spring spacers 35 such as Bellville springs, which are designed to operate at solid height when compressed for resisting further movement of the cylinder blocks away from the porting plate. Shims 36 can also be optionally arranged in the series arrangement of spacer tubes 34 and spring spacers 35. The shims 36 can be used in place of, or in addition to shims 30 between the port plate and housing sections of housing 23 for closely controlling the predetermined amount of permissible movement of the cylinder blocks away from the port plate during cold start-up of the integrated drive generator.

Figures 5, 6:
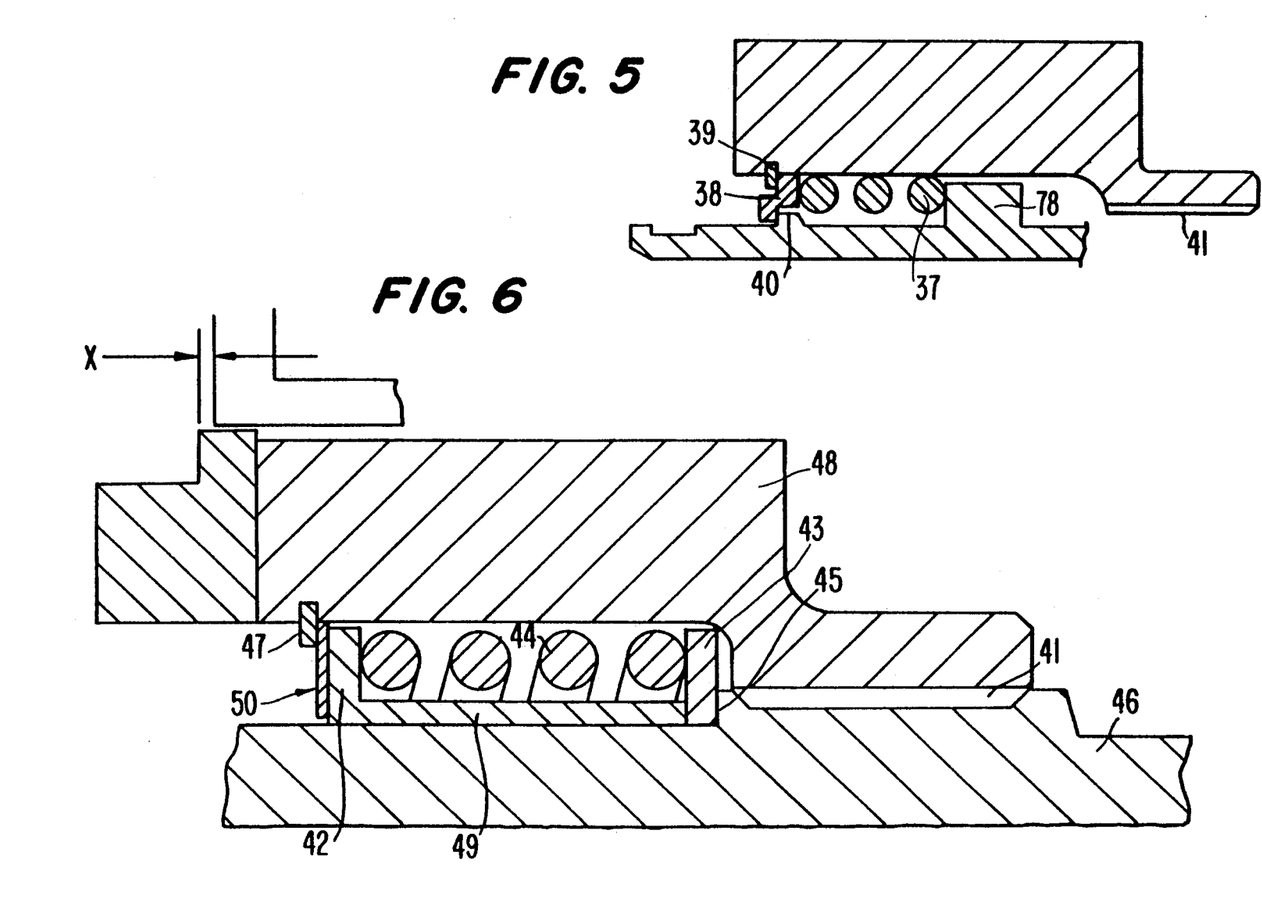
FIG. 5 is an enlarged, cross-sectional view of a portion of a hydraulic pump and motor assembly according to a third embodiment of the invention.
FIG. 6 is an enlarged, cross-sectional view of a portion of a hydraulic pump and motor assembly depicting a fourth embodiment of the invention.

The embodiment of FIG. 5 employs a helical coil spring 37 which acts between a spring seat 38 held in place on the cylinder block by retaining ring 39, and a shoulder 78 on the adjacent shaft at the opposite end of the spring 37. Another shoulder 40 is located on the shaft adjacent the spring seat to serve as a stop or holddown for preventing the cylinder block from moving away from the port plate more than the predetermined amount which will ensure establishment of hydraulic continuity between the pump and motor without substantial delay during cold start-up of the integrated drive generator. A splined connection 41 between the cylinder block and its shaft necessitates that the two rotate as a unit while permitting relative axial movement of the cylinder block with respect to the shaft. One advantage of this embodiment is that there is no relative rotation of the cylinder block with respect to its stop or shoulder 40 so that the problem of wear is not a concern. The spring seat 38 can be shimmed, if desired, for close control of the movement of the cylinder block away from the port plate during cold start-up.

The embodiment of FIG. 6 comprises a pair of spring seats 42 and 43 at the opposite ends of helical coil spring 44 located between the shoulder 45 as a stop on shaft 46 and retaining ring 47 mounted on the cylinder block 48. Spring seat 42 has a solid tang 49 which is adapted to abut spring seat 43 to limit the compression of helical coil spring 44 and thereby the movement of the cylinder block away from the porting plate. A spacer 50 is located between a spring seat 42 and the retaining ring 47. During assembly, the spacer is arranged as shown and the block is moved to the right relative to the shaft 46 so that the spring seat tang 49 abuts against spring seat 43 and in turn the shoulder 45 on shaft 46 to stop further movement of the cylinder block. The required shim size between the porting plate and the outer housing section is then determined by measuring the dimension x, the spacer removed and an appropriately sized shim employed to obtain the desired limitation on the movement of the cylinder block away from the port plate so as to insure establishment of hydraulic continuity between the pump and motor without substantial delay during cold start-up of the integrated drive generator. With this arrangement the cylinder block can be shimmed to provide less than 0.010 inch maximum block lift.

Figure 7:
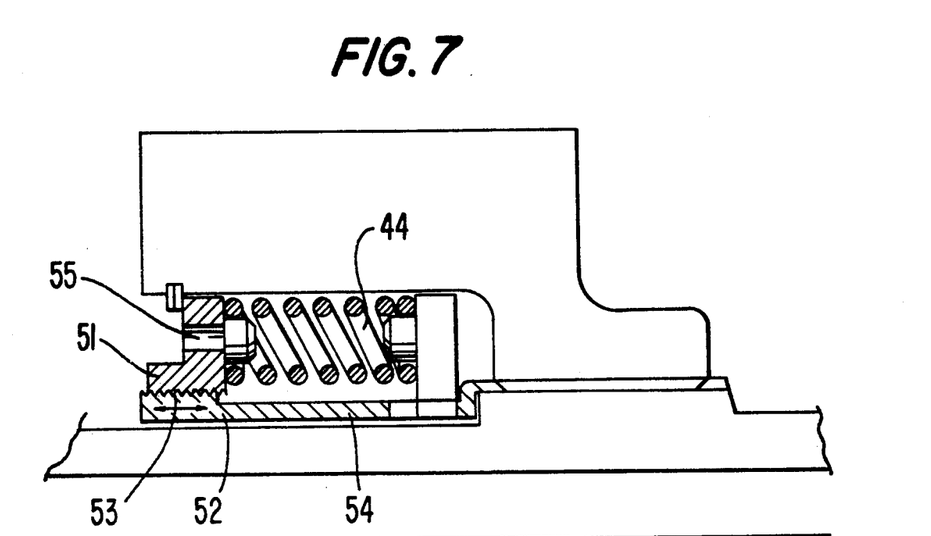
FIG. 7 is an enlarged, cross-sectional view of a portion of a hydraulic pump and motor assembly of a fifth embodiment of the invention.

The embodiment of FIG. 7 can advantageously eliminate the need for shimming. The embodiment is similar to that illustrated in FIG. 6 except that the unitary spring seat 42 is replaced by two components 51 and 52 which are threadedly connected together at 53 to permit adjustment in the length of the tang 54 of member 52 relative to spring seat 51 for limiting or adjusting the gap or predetermined amount of movement of the cylinder block away from the port plate. Holes 55 are formed in the component 51 of the spring seat for receiving a wrench to adjust the relative position of members 51 and 52. This arrangement permits adjustment to provide a maximum block lift of less than 0.010 inch. The force from helical coil spring 44 keeps the threads of threaded connection 53 essentially locked by friction during normal operation of the integrated drive generator.

During assembly, the member 51 of the spring seat is adjusted using a simulated port plate. The desired position of the spring seat 51 is then marked across the front face of the adjacent cylinder block with a marking etch line, for example. This initial adjustment is accomplished without the helical coil spring being located between the respective spring seats. Thereafter, the device is reassembled with the helical coil spring to the reference line.

Figure 8:
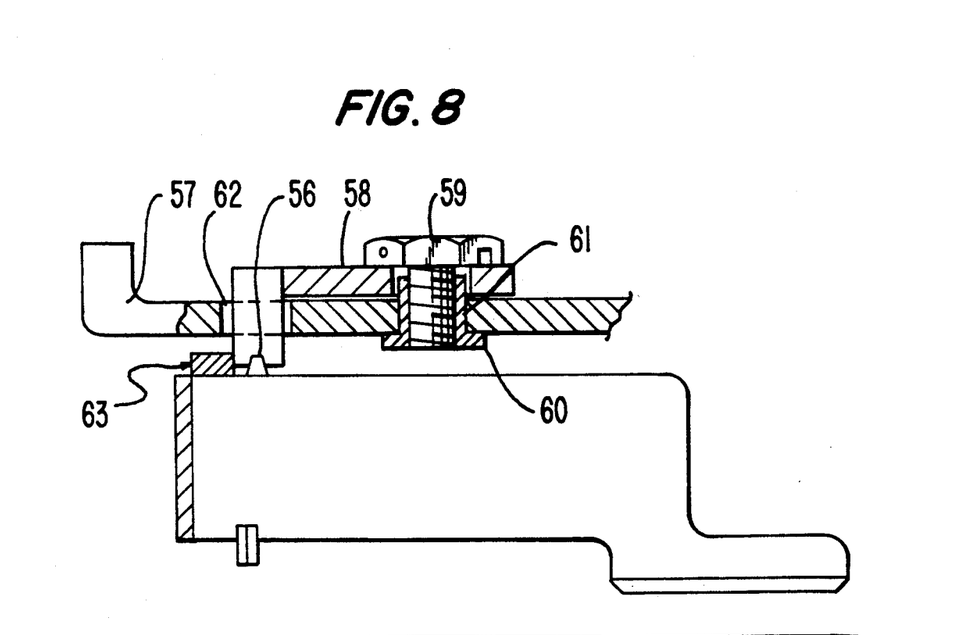
FIG. 8 is an enlarged, cross-sectional view of a portion of a hydraulic pump and motor assembly of a sixth embodiment of the invention.
Figure 9A:
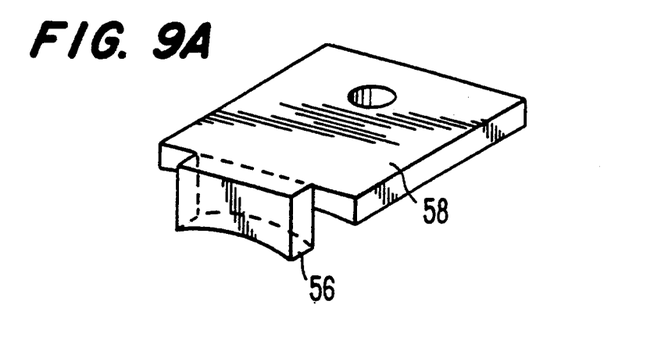
FIGS. 9A, 9B, 9C and 9D are respectively a perspective view, an end view, a side view and a top view of a component of the adjusting mechanism of the embodiment illustrated in FIG. 8.
Figure 9B:
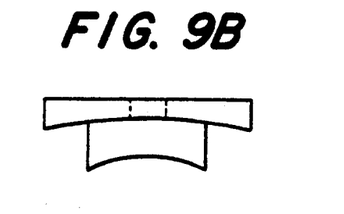
Figure 9C:
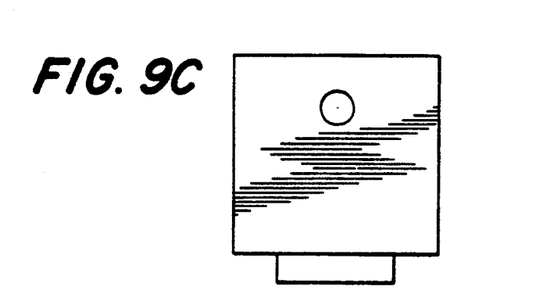
Figure 9D:
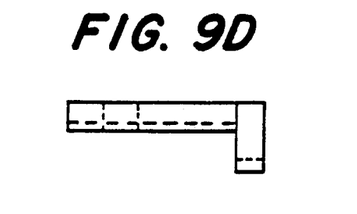

The embodiment of FIGS. 8 and 9A-9D is a variation of that shown in FIGS. 2 and 3 wherein the stop to prevent undesirable movement of the cylinder block away from the porting plate is located on the housing. Instead of the annulus 27 on the cylinder block and annular shoulder 28 of the housing, discrete physical abutments or stops are located on the housing at circumferentially spaced locations about the circumference of the cylinder block. For example, a physical abutment or stop 56 as shown in FIG. 8 is provided on the housing 57 adjacent the exhaust side of the cylinder block and two such stops are located on the housing on the piston intake side of the cylinder block. The stop 56 is part of a retainer member 58 which is threadedly connected to the outside of the housing 57 by means of screw 59 and bushing 60 located in an aperture 61 formed in the housing. The stop 56 of the retainer member 58 extends radially inward through a slot 62 in the housing for abutment with a portion of an annular block foot 63 fixedly connected to the circumference of the rotatable cylinder block. The retainer member can be formed of a material such as brass, different from that of the housing 57 for optimally resisting wear. The stop 56 of the member 58 can also be hard surfaced for this purpose.

Figure 10:
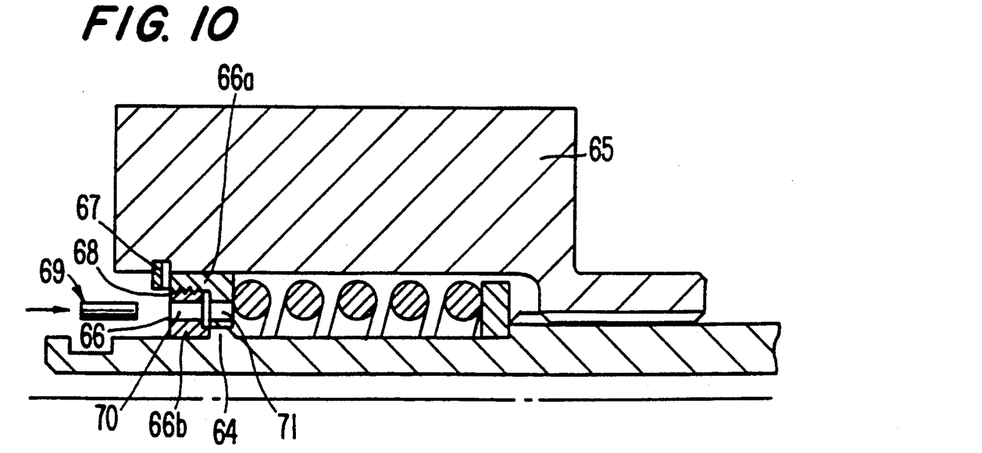
FIG. 10 is an enlarged, cross-sectional view of a portion of a hydraulic pump and motor assembly according to a seventh embodiment of the invention.

The embodiment of FIG. 10 includes a stop in the form of a shoulder 64 provided on the shaft adjacent the cylinder block 65. An adjustable spring seat 66 abuts against the shoulder 64 and retaining ring 67 on the cylinder block for preventing movement of the block away from the port plate. The spring seat 66 is formed of two members 66a and 66b which are threadedly connected at 68 to permit adjustment of the gap or predetermined amount. Once the desired adjustment has been made, locking pins 69 are inserted in respective, aligned apertures 70 and 71 circumferentially spaced in the respective members 66a and 66b. The locking pins prevent further relative rotation of the components of the spring seat to fix the gap or predetermined amount of movement of the block away from the port plate.

Figure 11:
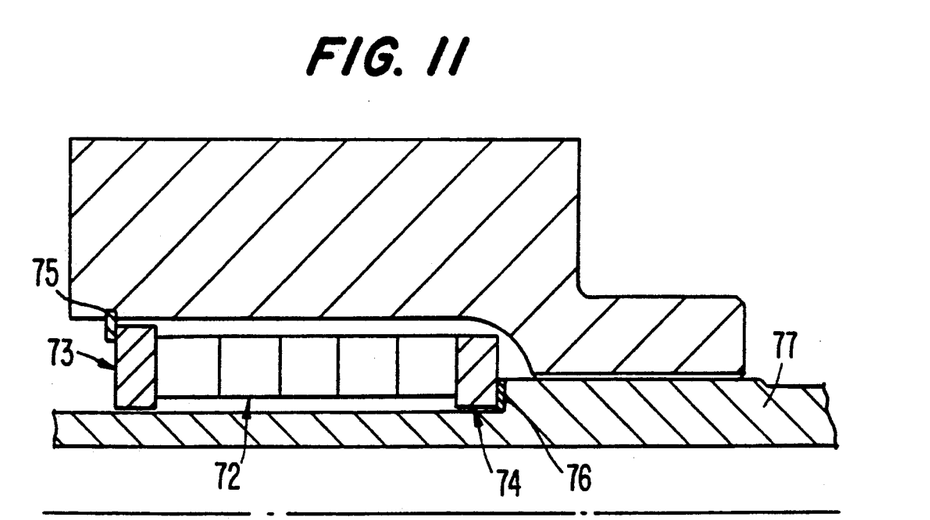
FIG. 11 is s an enlarged, cross-sectional view of a portion of a hydraulic pump and motor assembly of a another embodiment of the invention.

According to the embodiment of FIG. 11, a square, helical spring 72 is designed to operate at solid height. A shim 73 and spring seat 74 are located at respective ends of the spring. A retaining ring 75 on the cylinder block and shoulder 76 on adjacent shaft 77 serve to block further movement of the cylinder block away from the port plate when the square spring is compressed to solid height and, at the same time, yieldably bias the cylinder block in the direction of the port plate. Thus, the shimmed spring also serves to prevent the cylinder block from moving away from the port plate more than the predetermined amount which will ensure establishment of hydraulic continuity between the pump and motor without substantial delay during cold start-up of the integrated drive generator.

In addition to facilitating cold-start of the integrated drive generator, the improved integrated drive generator and hydraulic pump and motor assembly of the invention enable the generator to have fast cold-start capability in the case the airplane is disconnected from the generator and separately driven from ground motoring power for electrically operating the aircraft accessories. It is noted that such fast starts can occur, in part because there is no engine inertia for the ground motoring conditions. Another advantage of having a positive mechanical hold-down for the cylinder blocks according to the invention, is to momentarily retain the blocks relative to the port plate against a tendency to tip the blocks as in the event of a momentary loss of charge pressure due to an adverse attitude operational condition of the airplane. The hold-down arrangements also enable the hydraulic units to withstand very low charge pressure conditions for short periods of time, enhancing the attitude capability of the integrated drive generator. Further, with the invention very low piston-to-bore clearance can be specified because of the positive mechanical hold-down for the cylinder block. This tends to improve the integrated drive generator efficiency, as well as reduce piston-to-bore wear, thereby increasing the reliability and life of th integrated drive generator.

While we have shown and described several embodiments in accordance with the present invention, it is understood that the same is not limited thereto, but is susceptible to numerous changes and modifications as known to those skilled in the art. Therefore, I do not wish to be limited to the details shown and described herein, but intend to cover all such changes and modifications as are encompassed by the scope of the appended claims.

We claim:

1. In a method of making an integrated drive generator comprising providing a hydraulic pump and motor assembly including a variable displacement hydraulic pump and a fixed displacement hydraulic motor which have respective cylinder blocks arranged for rotation within housing means on opposite sides of a stationary port plate of the hydraulic pump and motor through which hydraulic continuity between the pump and motor is established during normal operation of the integrated drive generator, and wherein means are provided for resiliently biasing at least one of the cylinder blocks in the direction of the port plate such that a hydrostatic balance of the at least one cylinder block and the port plate can be established during normal operation of the integrated drive generator, the improvement comprising providing at least one stop to prevent the at least one cylinder block from moving away from the port plate more than a predetermined amount which will ensure establishment of hydraulic continuity between the pump and motor without substantial delay during cold start-up of the integrated drive generator, wherein the at least one stop prevents the at least one cylinder block from moving more than 0.010 inch away from the port plate.

2. The method according to claim 1, wherein the stops are provided on the housing means of the hydraulic pump and motor assembly for interaction with each of the cylinder blocks.

3. The method according to claim 1, wherein the stops are provided on a shaft on which the cylinder blocks are mounted.

4. In a method of making an integrated drive generator comprising providing a hydraulic pump and motor assembly including a variable displacement hydraulic pump and a fixed displacement hydraulic motor which have respective cylinder blocks arranged for rotation within housing means on opposite sides of a stationary port plate of the hydraulic pump and motor through which hydraulic continuity between the pump and motor is established during normal operation of the integrated drive generator, and wherein means are provided for resiliently biasing at least one of the cylinder blocks in the direction of the port plate such that a hydrostatic balance of the at least one cylinder block and the port plate can be established during normal operation of the integrated drive generator, the improvement comprising providing at least one stop to prevent the at least one cylinder block from moving away from the port plate more than a predetermined amount which will ensure establishment of hydraulic continuity between the pump and motor without substantial delay during cold start-up of the integrated drive generator, wherein the at least one stop prevents the at least one cylinder block from moving more than 0.010 inch away from the port plate, and further comprising providing at least one shim between the port plate and the housing means during assembly of the hydraulic pump and motor assembly to closely control the predetermined amount.

5. The method according to claim 1, further comprising providing a mechanism for adjusting the predetermined amount and adjusting said mechanism to set the predetermined amount.

6. The method according to claim 5, wherein the adjusting is accomplished during assembly of the hydraulic pressure pump and motor assembly.

7. The method according to claim 5, wherein the adjusting mechanism is accessible outside the housing means to permit the adjusting of the predetermined amount after assembly of the components of the hydraulic pump and motor assembly within the housing means.

8. The method according to claim 1, wherein the stops are provided in the vicinity of the means for resiliently biasing the cylinder blocks in the direction of the port plate.

9. In a method of operating an integrated drive generator, the integrated drive generator having a hydraulic pump and motor comprising a variable displacement pump and a fixed displacement hydraulic motor which have respective cylinder blocks arranged for rotation within housing means on opposite sides of a stationary port plate of the hydraulic pump and motor through which hydraulic continuity between the pump and motor is established during normal operation of the integrated drive generator, said method comprising resiliently biasing at least one cylinder block in the direction of the port plate and establishing a hydrostatic balance of the at least one cylinder block and the port plate during normal operation of the integrated drive generator, the improvement comprising preventing the at least one cylinder block from moving away from the port plate more than a predetermined amount which will ensure establishment of hydraulic continuity between the pump and motor without substantial delay during cold start-up of the integrated drive generator, wherein the at least one cylinder block is prevented from moving more than 0.010 inch away from the port plate.

10. The method according to claim 9, wherein the cylinder blocks of the pump and motor are prevented from moving away from the port plate more than said predetermined amount.

11. The method according to claim 9, wherein said preventing is accomplished through the use of at least one stop located in the hydraulic pump and motor assembly for blocking movement of the at least one cylinder block away from the porting plate a distance greater than said predetermined amount.

12. The method according to claim 11, wherein the at least one stop is provided on the housing means of the hydraulic pump and motor assembly.

13. The method according to claim 16, wherein the at least one stop is provided on a shaft on which said at least one cylinder block is mounted.

14. The method according to claim 11, wherein at least one spring is located between said at least one cylinder block and the at least one stop for resiliently biasing the at least one cylinder block in the direction of the port plate, said at least one spring being compressible to solid height during said preventing.

15. An integrated drive generator comprising a hydraulic pump and motor which includes a variable displacement hydraulic pump and a fixed displacement hydraulic motor, the pump and motor having respective cylinder blocks arranged for rotation within housing means on opposite sides of a stationary port plate of the hydraulic pump and motor through which hydraulic continuity between the pump and motor is established during normal operation of the integrated drive generator, means for resiliently biasing at least one of the cylinder blocks in the direction of the port plate such that a hydrostatic balance of the at least one cylinder block and port plate can be established during normal operation of the integrated drive generator, and at least one stop for preventing the at least one cylinder block from moving away from the port plate more than a predetermined amount which will ensure establishment of hydraulic continuity between the pump and motor without substantial delay during cold start-up of the integrated drive generator, wherein the at least one stop prevents the cylinder blocks from moving more than 0.010 inch away from the port plate.

16. The integrated drive generator according to claim 15, wherein stops are provided on the housing means of the hydraulic differential for interaction with the cylinder blocks.

17. The integrated drive generator according to claim 15, wherein at least one stop is provided on a shaft of the hydraulic pump and motor assembly on which a cylinder block is mounted.

18. An integrated drive generator comprising a hydraulic pump and motor assembly which includes a variable displacement hydraulic pump and a fixed displacement hydraulic motor, the pump and motor having respective cylinder blocks arranged for rotation within housing means on opposite sides of a stationary port plate of the hydraulic pump and motor assembly through which hydraulic continuity between the pump and motor is established during normal operation of the integrated drive generator, means for resiliently biasing the cylinder blocks in the direction of the port plate such that a hydrostatic balance of the cylinder blocks and port plate can be established during normal operation of the integrated drive generator, and at least one stop for preventing each cylinder block from moving away from the port plate more than a predetermined amount which will ensure establishment of hydraulic continuity between the pump and motor without substantial delay during cold start-up of the integrated drive generator, wherein the at least one stop prevents the at least one cylinder block from moving more than 0.010 inch away from the port plate, and further comprising at least one shim located between the port plate and the housing means to closely control the predetermined amount.

19. The integrated drive generator according to claim 15, further comprising a mechanism for adjusting the predetermined amount.

20. The integrated drive generator according to claim 19, wherein the adjusting mechanism is accessible outside the housing means to permit adjustment of the predetermined amount after assembly of the components of the hydraulic pump and motor assembly within the housing means.

21. The integrated drive generator according to claim 15, wherein at least one stop is located in the vicinity of the means for resiliently biasing.

22. An integrated drive generator comprising a hydraulic pump and motor which includes a variable displacement hydraulic pump and a fixed displacement hydraulic motor, the pump and motor having respective cylinder blocks arranged for rotation within housing means on opposite sides of a stationary port plate of the hydraulic pump and motor through which hydraulic continuity between the pump and motor is established during normal operation of the integrated drive generator, means for resiliently biasing at least one of the cylinder blocks in the direction of the port plate such that a hydrostatic balance of the at least one cylinder block and port plate can be established during normal operation of the integrated drive generator, and at least one stop for preventing the at least one cylinder block from moving away from the port plate more than a predetermined amount which will ensure establishment of hydraulic continuity between the pump and motor without substantial delay during cold start-up of the integrated drive generator, wherein said means for resiliently biasing the at least one cylinder block in the direction of the port plate comprises a square spring which when compressed to a solid height serves as said at least one stop.

23. The integrated drive generator according to claim 15, wherein at least one stop is located on a shaft on which a cylinder block is mounted, said stop interacting with a spring seat attached to said cylinder block for preventing the cylinder block from moving away from the port plate more than said predetermined amount, the spring seat also serving as a seat for a spring of said means for resiliently biasing.

24. An integrated drive generator comprising a hydraulic pump and motor which includes a variable displacement hydraulic pump and a fixed displacement hydraulic motor, the pump and motor having respective cylinder blocks arranged for rotation within housing means on opposite sides of a stationary port plate of the hydraulic pump and motor through which hydraulic continuity between the pump and motor is established during normal operation of the integrated drive generator, means for resiliently biasing at least one of the cylinder blocks in the direction of the port plate such that a hydrostatic balance of the at least one cylinder block and port plate can be established during normal operation of the integrated drive generator, and at least one stop for preventing the at least one cylinder block from moving away from the port plate more than a predetermined amount which will ensure establishment of hydraulic continuity between the pump and motor without substantial delay during cold start-up of the integrated drive generator, wherein said means for resiliently biasing includes a spring which is collapsed to solid height for interaction with a stop for preventing a cylinder block from moving away from the port plate more than said predetermined amount.

* * * * *